United States Patent
Bestgen

(12) 
(10) Patent No.: US 6,308,786 B1
(45) Date of Patent: Oct. 30, 2001

(54) PNEUMATIC POWERED WINCH ACTUATING DEVICE

(76) Inventor: Philip N. Bestgen, R.R. 2 Box 24, Whitewood, SD (US) 57793

( * ) Notice: Subject to any disclaimer, the term of this patent is extended or adjusted under 35 U.S.C. 154(b) by 0 days.

(21) Appl. No.: 09/737,784

(22) Filed: Dec. 15, 2000

(51) Int. Cl.$^7$ .................................................. B25B 13/46
(52) U.S. Cl. ........................ 173/168; 173/169; 173/170; 173/29; 173/216
(58) Field of Search ................................... 173/170, 168, 173/169, 29, 171, 216; 81/57.39, 57–44

(56) References Cited

U.S. PATENT DOCUMENTS

| D. 329,794 | 9/1992 | Graham . | |
|---|---|---|---|
| 2,293,786 | 8/1942 | Worden . | |
| 4,524,651 | 6/1985 | Dubiel et al. . | |
| 4,747,433 | 5/1988 | Dixon . | |
| 5,095,780 | 3/1992 | Beuke . | |
| 5,240,236 | 8/1993 | Mierau . | |
| 5,357,828 | 10/1994 | Spirer . | |
| 5,377,565 | 1/1995 | Mangum . | |
| 5,509,489 | * 4/1996 | Lower, Jr. ............................. | 173/170 |
| 5,598,892 | * 2/1997 | Fox ....................................... | 173/170 |
| 5,918,370 | * 7/1999 | Wells ................................... | 173/169 |
| 5,926,913 | * 7/1999 | Hernandez et al. ................. | 173/170 |

\* cited by examiner

Primary Examiner—Scott A. Smith

(57) ABSTRACT

A pneumatic powered winch actuating device for tightening a winch using a pneumatic tool. The pneumatic powered winch actuating device includes an air wrench. The air wrench is couplable to an air supply hose. A shaft is rotatably coupled to the air wrench. The shaft has a first portion and a second portion. The first portion is positioned adjacent to the air wrench, and the second portion has a threaded peripheral wall such that threads extend outwardly from the shaft. The air wrench selectively rotates the shaft in a first direction. A winch engaging member includes a casing securely attached to the air wrench such that the shaft extends into the casing. A coupling member has a well extending therein and has a size adapted for releasably receiving and coupling to a cylinder. The cylinder is securely attached to a winch. A rod is integrally coupled to and extends away from the coupling member. The rod extends through the casing such that the rod is rotatably coupled to the casing. The rod extends through and is integrally coupled to a gear. The gear is positioned in the casing. The gear is located such that the threaded portion of the shaft may engage the gear. The hose is fluidly coupled to the air wrench, wherein the air wrench may rotate the gear such that the coupling member rotates the winch.

20 Claims, 2 Drawing Sheets

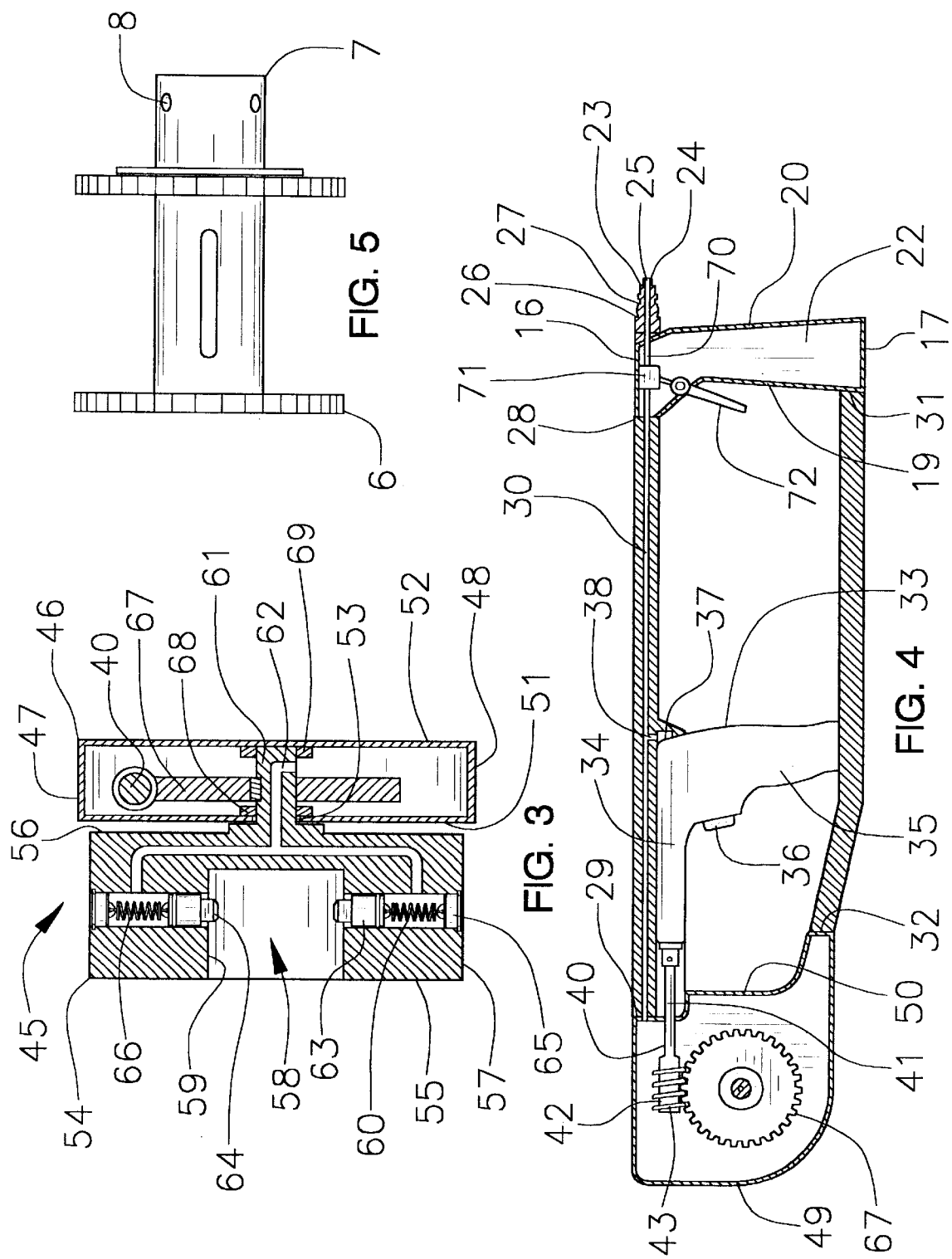

PNEUMATIC POWERED WINCH ACTUATING DEVICE

BACKGROUND OF THE INVENTION

1. Field of the Invention

The present invention relates to winch tightening tools and more particularly pertains to a new pneumatic powered winch actuating device for tightening a winch using a pneumatic tool.

2. Description of the Prior Art

The use of winch tightening tools is known in the prior art. More specifically, winch tightening tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,747,433; 5,095,780; 5,357,828; 4,524,651; 5,377,565; 5,240,236; 2,293,786; and U.S. Des. Pat. No. 329,794.

While these devices fullfill their respective, particular objectives and requirements, the aforementioned patents do not disclose a new pneumatic powered winch actuating device. The inventive device includes an air wrench. The air wrench is couplable to an air supply hose. A shaft is rotatably coupled to the air wrench. The shaft has a first portion and a second portion. The first portion is positioned adjacent to the air wrench, and the second portion has a threaded peripheral wall such that threads extend outwardly from the shaft. The air wrench selectively rotates the shaft in a first direction. A winch engaging- member includes a casing securely attached to the air wrench such that the shaft extends into the casing. A coupling member has a well extending therein and has a size adapted for releasably receiving and coupling to a cylinder. The cylinder is securely attached to a winch. A rod is integrally coupled to and extends away from the coupling member. The rod extends through the casing such that the rod is rotatably coupled to the casing. The rod extends through and is integrally coupled to a gear. The gear is positioned in the casing. The gear is located such that the threaded portion of the shaft may engage the gear. The hose is fluidly coupled to the air wrench, wherein the air wrench may rotate the gear such that the coupling member rotates the winch.

In these respects, the pneumatic powered winch actuating device according to the present invention substantially departs from the conventional concepts and designs of the prior art, and in so doing provides an apparatus primarily developed for the purpose of tightening a winch using a pneumatic tool.

SUMMARY OF THE INVENTION

In view of the foregoing disadvantages inherent in the known types of winch tightening tools now present in the prior art, the present invention provides a new pneumatic powered winch actuating device construction wherein the same can be utilized for tightening a winch using a pneumatic tool.

The general purpose of the present invention, which will be described subsequently in greater detail, is to provide a new pneumatic powered winch actuating device apparatus and method which has many of the advantages of the winch tightening tools mentioned heretofore and many novel features that result in a new pneumatic powered winch actuating device which is not anticipated, rendered obvious, suggested, or even implied by any of the prior art winch tightening tools, either alone or in any combination thereof.

To attain this, the present invention generally comprises an air wrench. The air wrench is couplable to an air supply hose. A shaft is rotatably coupled to the air wrench. The shaft has a first portion and a second portion. The first portion is positioned adjacent to the air wrench, and the second portion has a threaded peripheral wall such that threads extend outwardly from the shaft. The air wrench selectively rotates the shaft in a first direction. A winch engaging member includes a casing securely attached to the air wrench such that the shaft extends into the casing. A coupling member has a well extending therein and has a size adapted for releasably receiving and coupling to a cylinder. The cylinder is securely attached to a winch. A rod is integrally coupled to and extends away from the coupling member. The rod extends through the casing such that the rod is rotatably coupled to the casing. The rod extends through and is integrally coupled to a gear. The gear is positioned in the casing. The gear is located such that the threaded portion of the shaft may engage the gear. The hose is fluidly coupled to the air wrench, wherein the air wrench may rotate the gear such that the coupling member rotates the winch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pneumatic powered winch actuating device apparatus and method which has many of the advantages of the winch tightening tools mentioned heretofore and many novel features that result in a new pneumatic powered winch actuating device which is not anticipated, rendered obvious, suggested, or even implied by any of the prior art winch tightening tools, either alone or in any combination thereof.

It is another object of the present invention to provide a new pneumatic powered winch actuating device which may be easily and efficiently manufactured and marketed.

It is a further object of the present invention to provide a new pneumatic powered winch actuating device which is of a durable and reliable construction.

An even further object of the present invention is to provide a new pneumatic powered winch actuating device which is susceptible of a low cost of manufacture with regard to both materials and labor, and which accordingly is then susceptible of low prices of sale to the consuming public, thereby making such pneumatic powered winch actuating device economically available to the buying public.

Still yet another object of the present invention is to provide a new pneumatic powered winch actuating device which provides in the apparatuses and methods of the prior art some of the advantages thereof, while simultaneously overcoming some of the disadvantages normally associated therewith.

Still another object of the present invention is to provide a new pneumatic powered winch actuating device for tightening a winch using a pneumatic tool.

Yet another object of the present invention is to provide a new pneumatic powered winch actuating device which includes an air wrench. The air wrench is couplable to an air supply hose. A shaft is rotatably coupled to the air wrench. The shaft has a first portion and a second portion. The first portion is positioned adjacent to the air wrench, and the second portion has a threaded peripheral wall such that threads extend outwardly from the shaft. The air wrench selectively rotates the shaft in a first direction. A winch engaging member includes a casing securely attached to the air wrench such that the shaft extends into the casing. A coupling member has a well extending therein and has a size adapted for releasably receiving and coupling to a cylinder. The cylinder is securely attached to a winch. A rod is integrally coupled to and extends away from the coupling member. The rod extends through the casing such that the rod is rotatably coupled to the casing. The rod extends through and is integrally coupled to a gear. The gear is positioned in the casing. The gear is located such that the threaded portion of the shaft may engage the gear. The hose is fluidly coupled to the air wrench, wherein the air wrench may rotate the gear such that the coupling member rotates the winch.

Still yet another object of the present invention is to provide a new pneumatic powered winch actuating device that allows a person to use pneumatic power to wind a winch. The device is adapted for coupling to a standard winch found on flatbed trailers. Often these trailers have multiple winches secured to it for tying down loads. Generally, the winches are tightened by extending a crowbar through a hole in a cylinder attached to the winch. The cylinder is then rotated to draw the strap in. This is very time consuming if there are multiple winches to tighten. The current invention uses pneumatic energy to rotate the cylinder in an efficient manner and may use the pressurized air supplied by the semi-truck pulling the trailer.

These together with other objects of the invention, along with the various features of novelty which characterize the invention. are pointed out with particularity in the claims annexed to and forming a part of this disclosure. For a better understanding of the invention, its operating advantages and the specific objects attained by its uses, reference should he made to the accompanying drawings and descriptive matter in which there are illustrated preferred embodiments of the invention.

BRIEF DESCRIPTION OF THE DRAWINGS

The invention will he better understood and objects other than those set forth above will become apparent when consideration is given to the following detailed description thereof. Such description makes reference to the annexed drawings wherein:

FIG. 3 is a schematic cross-sectional view taken along line 3—3 of the present invention.

FIG. 4 is a schematic side cross-sectional view of the present invention.

FIG. 5 is a schematic top view of the winch of the present invention.

DESCRIPTION OF THE PREFERRED EMBODIMENT

Figure 1:
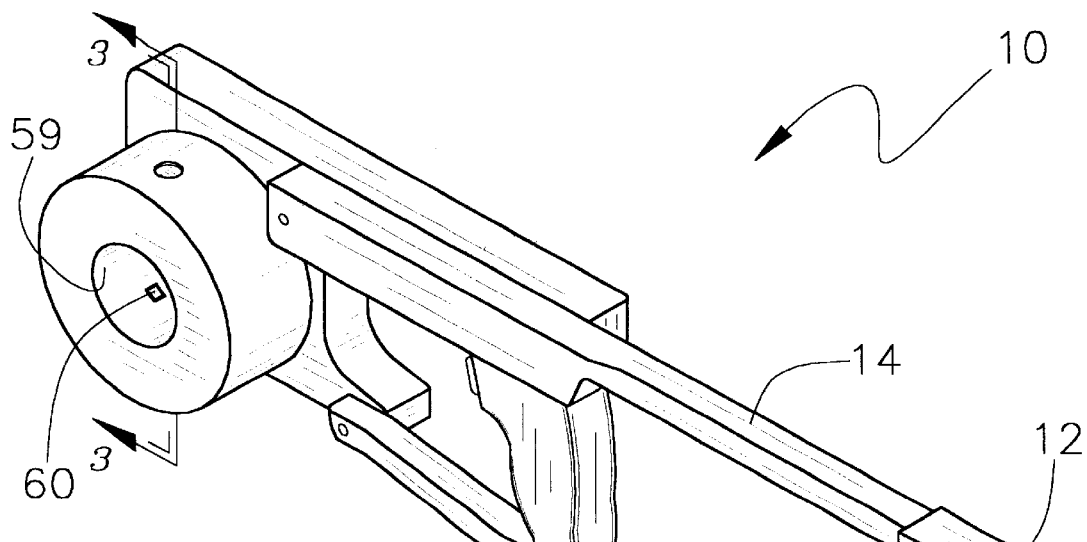
FIG. 1 is a schematic perspective view of a new pneumatic powered winch actuating device according to the present invention.
Figure 2:
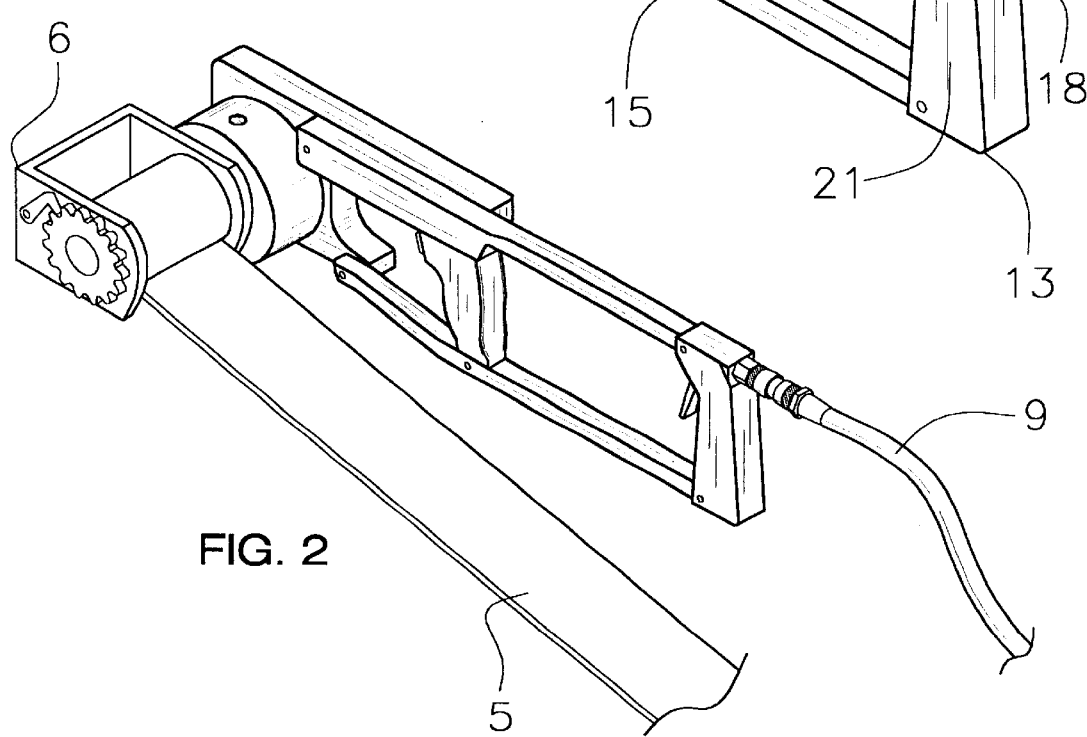
FIG. 2 is a schematic perspective in use view of the present invention.

With reference now to the drawings, and in particular to FIGS. 1 through 5 thereof, a new pneumatic powered winch actuating device embodying the principles and concepts of the present invention and generally designated by the reference numeral 10 will be described.

As best illustrated in FIGS. 1 through 5, the pneumatic powered winch actuating device 10 is designed for releasably engaging a winch 6. The winch 6 has a cylinder 7 coupled thereto. The cylinder 7 has a peripheral wall having a plurality of holes 8 extending therethrough. An air supply hose 9 supplies air to the device.

The device 10 comprises a frame 12 having a handle portion 13, a first bar 14 and a second bar 15. The handle portion 13 has a top end 16, a bottom end 17, and a peripheral wall 18 integrally coupled thereto and extending therebetween. The peripheral wall 18 includes a front side 19, a back side 20, and two lateral sides 21. The handle portion 13 has a lumen 22 therein. A protruding member 23 is integrally coupled to and extends away from the back side 20 of the peripheral wall 18. The protruding member 23 is positioned generally adjacent to the top end 16 of the handle portion 13. The protruding member 23 has a free end 24 having a hole 25 therein and extending into the lumen 22. The protruding member 23 has an outer surface 26 having a plurality of channels 27 therein extending around the protruding member 23 such that the hose 9 may releasably engage the protruding member 23. The protruding member 23 is a conventional nozzle adapted for fluidly coupling to a conventional hose valve.

The first bar 14 is elongate and has a first end 28 and a second end 29. The first end 28 of the first bar 14 is securely attached to the handle portion 13. The first end 28 is positioned generally adjacent to the top end 16 of the handle portion 13. The first bar 14 has a hole 30 extending along its length and through the first 28 and second 29 ends. The hole 30 in the first bar 14 extends into the lumen 22 of the handle portion 13 such that the first bar 14 is fluidly coupled to the lumen 22.

The second bar 15 is elongate and has a first end 3 1 and a second end 32. The first end 31 of the second bar 15 is securely attached to the handle portion 13 and is positioned generally adjacent to the bottom end 17 of the handle portion 13. The second bar 15 has a longitudinal axis orientated generally parallel to a longitudinal axis of the first bar 14. Both the first 14 and second 15 bars are hollow so that the device is light.

An air wrench 33 has a top portion 34 and a bottom portion 35. The bottom portion 35 has a trigger 36 thereon for actuating the air wrench 33. The top portion 34 is securely attached to the first bar 14 and the bottom portion 35 has a bottom edge securely attached to the second bar 15. The air wrench 33 is positioned generally adjacent to the second ends 29, 32 of the first 14 and second 15 bars. The top portion 34 has a bore 37 therein. The first bar 14 has a channel 38 therein. The channel 38 fluidly couples the hole 30 in the first bar 14 to the bore 36 in the top portion 34. The air wrench 32 is a conventional air wrench as made by Chicago Pneumatic Tool Company, Automotive Business Unit, 1800 Overview Drive, Rock Hill, S.C.

A shaft 40 is rotatably coupled to the top portion 34 of the air wrench 32. The shaft 40 has a first portion 41 and a second portion 42. The first portion 41 is positioned adjacent to the air wrench 33. The second portion 42 has a threaded peripheral wall such that threads 43 extend outwardly from the shaft 40. The air wrench 33 selectively rotates the shaft 40 in a first direction.

A winch engaging member 45 is used for coupling the air wrench 33 to the winch 6. The winch engaging member 45 includes a casing 46. The casing 46 has a top wall 47, a bottom wall 48, a front wall 49, a back wall 50, a first lateral side wall 51, and a second lateral side wall 52. The back wall 50 is securely attached to the second ends 29, 32 of the first 14 and second 15 bars. The hole 30 in the first bar extends into the casing 46. The second portion 42 of the shaft 40 extends through the back wall 50 and into the casing 46. The first lateral side wall 51 has an opening 53 therein.

A coupling member 54 is generally solid and has a first side 55, a second side 56, and an outer peripheral wall 57 extending therebetween. The coupling member 54 preferably has a disc shape. The first side 55 of the coupling member has a well 58 extending therein. The well 58 has an inner peripheral wall 59 having a plurality of holes 60 therein and extending towards the outer peripheral wall 57. Ideally, there are four holes 60 extending into the inner peripheral wall 59. The well 58 has a diameter generally equal to a diameter of the cylinder 7. Envisioned is a cylinder having a cross-section having a shape other than a circle, such as a hexagon, square or octagon, in which case the well 58 would have the same shape for coupling to the cylinder 7. The holes 60 may extend through the outer perimeter wall 57.

A rod 61 is integrally coupled to and extends away from the second side 56 of the coupling member 54. The rod 61 extends through the opening 53 in the first lateral side wall 51 of the casing 46 such that the rod 61 is rotatably coupled to the casing 46. The rod 61 has a portal 62 extending therein. The portal 62 has an opening generally adjacent to a free end of the rod and positioned in the easing 46. The portal 62 extends into the coupling member 54 and into each of the holes 60 in the coupling member.

Each of a plurality of pistons 63 is positioned in one of the holes 60 in the coupling member 54. Each of the pistons 63 preferably has a nub 64 thereon for extending into the well 58. Each of the pistons 63 is positionable in one ol the holes 8 in the cylinder 7. If the holes 60 go through the outer perimeter wall 57, a plug 65 is positioned in the hole 60 adjacent to the outer perimeter wall 57.

Each of a plurality of biasing means 66 biases one of the pistons 63 away from the well 58. Each of the biasing means 66 comprising a spring extending between and securely attached to one of the pistons 63 and a bottom wall, or plug 65, of a respective hole 60.

The rod 61 extends through and is integrally coupled to a gear 67. The gear 67 is positioned in the casing 46. The gear 67 is located such that the threaded portion 42 of the shaft 40 may engage the gear 67. The gear 67 and shaft 40 arc a conventional worm 40 and worm gear 67 combination.

The rod 61 extends through an O-ring 68. The O-ring 68 is positioned between the gear 67 and an inner surface of the first lateral side wall 51. Preferably, the rod 61 extends through a second O-ring 69 positioned against an inner surface of the second lateral side wall 52. The O-rings help keep the rod 61 in position and seal the casing 46 so air does not escape.

A conduit 70 is positioned in the lumen 22. The conduit 70 extends between and fluidly couples the hole 30 in the first bar and the hole 25 in the protruding member 23. A valve member 71 is positioned in the conduit 70 and mechanically coupled thereto. An actuating means 72 selectively opens and closes the valve member 71. The actuating means 72 comprises a lever. The lever is mechanically coupled to the valve member and extends outwardly through the handle portion 13.

In use, the hose 9 is fluidly coupled to the protruding member 3 such that air may enter the first bar 14 when the actuating means 72 is actuated. Air travels through the conduit 70 and into the hole 30 in the first bar. The channel 38 in the first bar 14 carries air to the air wrench 33 so that the air wrench 33 may be used to turn the shaft 40 by actuating the trigger 36. The air enters the casing 46 and into the holes 60 of the coupling member 54 via the portal 62 in the rod 61. The air pushes the pistons 63 into the well 58. The nubs 64, or pistons, enter the holes 8 in the cylinder 7, which is positioned in the well 58. When the actuating means 72 is released, the biasing means 66 pull the pistons 63 away from the cylinder 7 so that winch engaging member 45 may be released from the winch 6. When the air wrench 36 is actuated, the shaft 40 turns the gear 67, which in turn turns the rod 61. The coupling member 54 turns the winch 6 to draw in the strap 5 in an efficient manner.

As to a further discussion of the manner of usage and operation of the present invention, the same should he apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pneumatic winch turning device, said device being adapted for releasably engaging a winch, the winch having a cylinder coupled thereto, said cylinder having a peripheral wall having a plurality of holes extending therethrough, an air supply hose supplying air to the device, said device comprising:

a frame, said frame having a first bar, a second bar, and handle portion, each of said top and second bars having a first end securely coupled to said handle portion, said frame having a protruding member thereon, said protruding member having a hole extending therein and extending through first bar, said hose being couplable to said protruding member such that air may flow through said hole;

an air wrench, said air wrench being securely coupled to said frame, said air wrench having a bore therein fluidly coupled to said hole in said first bar, said air wrench having a trigger therein for actuating said air wrench;

a shaft, said shaft being rotatably coupled to said air wrench, said shaft having a threaded peripheral wall such that threads extend outwardly from said shaft, wherein said air wrench selectively rotates said shaft in a first direction;

a winch engaging member, said winch engaging member including;

a casing, said casing being securely attached to second ends of said first and second bars, said shaft extending into said casing;

a coupling member, said coupling member having a well extending therein and having a size adapted for releasably receiving said cylinder and selectively coupling thereto;

a rod, said rod being integrally coupled to and extending away from said coupling member, said rod extended through said casing such that said rod is rotatably coupled to said casing;

a gear, said rod extending through and being integrally coupled to said gear, said gear being positioned in said casing, said gear being located such that said threaded portion of said shaft may engage said gear;

wherein said hose is fluidly coupled to said protruding member such that air may enter said air wrench, wherein said air wrench may rotate said gear such that said coupling member rotates said winch.

2. The pneumatic winch turning device as in claim 1, wherein said handle portion comprises:

a handle portion, said handle portion having a top end, a bottom end, and a peripheral wall integrally coupled thereto and extending therebetween, said peripheral wall including a front side, a back side, and two lateral sides, said handle portion having a lumen therein, said protruding member being integrally coupled to and extending away from said backside of said peripheral wall, said protruding member being positioned generally adjacent to said top end of said handle portion, said hole in said protruding member extending into said lumen and into said first bar.

3. The pneumatic winch turning device as in claim 2, further including:

a conduit, said conduit being positioned in said lumen, said conduit extending between and fluidly coupling said hole in said first bar and said hole in said protruding member;

a valve member, said valve member being positioned in said conduit;

an actuating means for selectively opening and closing said valve member, said actuating means comprising a lever, said lever being mechanically coupled to said valve member and extending outwardly through said handle portion.

4. The pneumatic winch turning device as in claim 2, wherein said protruding member further includes:

said protruding member having an outer surface having a plurality of channels therein extending around said protruding member such that said hose may releasably engage said protruding member.

5. The pneumatic winch turning device as in claim 2, wherein said first bar further includes:

said first end of said first bar being positioned generally adjacent to said top end of said handle portion, said first bar having a hole extending along its length and through said first and second ends, said hole in said first bar extending into said lumen of said handle portion such that said first bar is fluidly coupled to said lumen.

6. The pneumatic winch turning device as in claim 5, wherein said second bar further includes said first end of said second bar being positioned generally adjacent to said bottom end of said handle portion, said second bar having a longitudinal axis orientated generally parallel to a longitudinal axis of said first bar.

7. The pneumatic winch turning device as in claim 6, wherein said air wrench further comprises:

said air wrench having a top portion and a bottom portion, said trigger being positioned in said bottom portion, said top portion being securely attached to said first bar and said bottom portion having a bottom edge securely attached to said second bar, said air wrench being positioned generally adjacent to said second ends of said first and second bars, said first bar having a channel therein, said channel fluidly coupling said hole in said first bar and said bore in said top portion.

8. The pneumatic winch turning device as in claim 1, wherein said protruding member further includes:

said protruding member having an outer surface having a plurality of channels therein extending around said protruding member such that said hose may releasably engage said protruding member.

9. The pneumatic winch turning device as in claim 1, said device further including:

an actuating means for selectively allowing air to pass into said hole in said first bar, said actuating means being positioned between said protruding member and said first bar.

10. The pneumatic winch turning device as in claim 1, wherein said winch engaging member further comprises:

said casing having a top wall, a bottom wall, a front wall, a back wall, a first lateral side wall, and a second lateral side wall, said back wall being securely attached to said second ends of said first and second bars, said hole in said first bar extending into said casing, said second portion of said shaft extending through said back wall and into said casing, said first lateral side wall having an opening therein;

said coupling member being generally solid and having a first side, a second side, and an outer peripheral wall extending therebetween, said first side of said coupling member having said well extending therein, said well having an inner peripheral wall, said inner peripheral wall having a plurality of holes therein extending towards said outer peripheral wall, said well having a diameter generally equal to a diameter of said cylinder;

said rod being integrally coupled to and extending away from said second side of said coupling member, said rod extended through said opening in said first lateral side wall of said casing such that said rod is rotatably coupled to said casing, said rod having a portal extending therein, said portal having an opening generally adjacent to a free end of said rod, said portal extending into said coupling member, said portal extending into each of said holes in said coupling member; and a plurality of pistons, each of said pistons being positioned in one of said holes in said coupling member, each of said pistons being removably extendable into said well, each of said pistons being positionable in one of said holes in said cylinder.

11. The pneumatic winch turning device as in claim 10, further including:

a plurality of biasing means, each of said biasing means biasing one of said pistons away from said well.

12. The pneumatic winch turning device as in claim 11, each of said biasing means comprising:

a spring extending between and securely attached to one of said pistons and a bottom wall of a respective hole.

13. The pneumatic winch turning device as in claim 11, wherein said handle portion comprises:

said handle portion having a top end, a bottom end, and a peripheral wall integrally coupled thereto and extending therebetween, said peripheral wall including a front side, a back side, and two lateral sides, said handle portion having a lumen therein, said protruding member being integrally coupled to and extending away from said backside of said peripheral wall, said protruding member being positioned generally adjacent to said top end of said handle portion, said hole in said protruding member extending into said lumen and into said first bar.

14. The pneumatic winch turning device as in claim 13, further including:

a conduit, said conduit being positioned in said lumen, said conduit extending between and fluidly coupling said hole in said first bar and said hole in said protruding member;

a valve member, said valve member being positioned in said conduit;

an actuating means for selectively opening and closing said valve member, said actuating means comprising a lever, said lever being mechanically coupled to said valve member and extending outwardly through said handle portion.

15. The pneumatic winch turning device as in claim 14, wherein said protruding member further includes:

said protruding member having an outer surface having a plurality of channels therein extending around said protruding member such that said hose may releasably engage said protruding member.

16. The pneumatic winch turning device as in claim 10, further including:

an O-ring, said rod extending through said O-ring, said O-ring being positioned between said gear and an inner surface of said first lateral side wall.

17. The pneumatic winch turning device as in claim 10, further including:

a plurality of biasing means, each of said biasing means biasing one of said pistons away from said well.

18. The pneumatic winch turning device as in claim 1, wherein said winch engaging member further comprises:

said casing having a top wall, a bottom wall, a front wall, a back wall, a first lateral side wall, and a second lateral side wall, said back wall being securely attached to said air wrench, wherein said air wrench forces air into said casing, said second portion of said shaft extending through said back wall and into said casing, said first lateral side wall having an opening therein;

said coupling member being generally solid and having a first side, a second side, and an outer peripheral wall extending therebetween, said first side of said coupling member having said well extending therein, said well having an inner peripheral wall, said inner peripheral wall having a plurality of holes therein extending towards said outer peripheral wall, said well having a diameter generally equal to a diameter of said cylinder;

said rod being integrally coupled to and extending away from said second side of said coupling member, said rod extended through said opening in said first lateral side wall of said casing such that said rod is rotatably coupled to said casing, said rod having a portal extending therein, said portal having an opening generally adjacent to a free end of said rod, said portal extending into said coupling member, said portal extending into each of said holes in said coupling member; and a plurality of pistons, each of said pistons being positioned in one of said holes in said coupling member, each of said pistons being removably extendable into said well, each of said pistons being positionable in one of said holes in said cylinder.

19. A pneumatic winch turning device, said device being adapted for releasably engaging a winch, the winch having a cylinder coupled thereto, said cylinder having a peripheral wall having a plurality of holes extending therethrough, an air supply hose supplying air to the device, said device comprising:

an air wrench, said air wrench being couplable to said air supply hose;

a shaft, said shaft being rotatably coupled to said air wrench, said shaft having a first portion and a second portion, said first portion being positioned adjacent to said air wrench, said second portion having a threaded peripheral wall such that threads extend outwardly from said shaft, wherein said air wrench selectively rotates said shaft in a first direction;

a winch engaging member, said winch engaging member comprising;

a casing, said casing being securely attached to said air wrench such that said shaft extends into said casing;

a coupling member, said coupling member having a well extending therein and having a size adapted for releasably receiving said cylinder and selectively coupling thereto;

a rod, said rod being integrally coupled to and extending away from said coupling member, said rod extended through said casing such that said rod is rotatably coupled to said casing; p2 a gear, said rod extending through and being integrally coupled to said gear, said gear being positioned in said casing, said gear being located such that said threaded portion of said shaft may engage said gear;

wherein said hose is fluidly coupled to said air wrench, wherein said air wrench may rotate said gear such that said coupling member rotates said winch.

20. A pneumatic winch turning device, said device being adapted for releasably engaging a winch, the winch having a cylinder coupled thereto, said cylinder having a peripheral wall having a plurality of holes extending therethrough, an air supply hose supplying air to the device, said device comprising:

a frame, said frame comprising;

a handle portion, said handle portion having a top end, a bottom end, and a peripheral wall integrally coupled thereto and extending therebetween, said peripheral wall including a front side, a back side, and two lateral sides, said handle portion having a lumen therein, a protruding member being integrally coupled to and extending away from said backside of said peripheral wall, said protruding member being positioned generally adjacent to said top end of said handle portion, said protruding member having a free end having a hole therein and extending into said lumen, said protruding member having an outer surface having a plurality of channels therein extending around said protruding member such that said hose may releasably en gage said protruding member;

a first bar, said first bar being elongate and having a first end and a second end, said first end of said first bar being securely attached to said handle portion, said first end being positioned generally adjacent to said top end of said handle portion, said first bat having a hole extending along its length and through said first and second ends, said hole in said first bar extending into said lumen of said handle portion such that said first bar is fluidly coupled to said lumen;

a second bar, said second bar being elongate and having a first end and a second end, said first end of said second bar being securely attached to said handle portion and being positioned generally adjacent to said bottom end of said handle portion, said second bar having a longitudinal axis orientated generally parallel to a longitudinal axis of said first bar;

an air wrench, said air wrench having a top portion and a bottom portion, said bottom portion having a trigger therein for actuating said air wrench, said top portion being securely attached to said first bar and said bottom portion having a bottom edge securely attached to said second bar, said air wrench being positioned generally adjacent to said second ends of said first and second bars, said top portion having a bore therein, said first bar having a channel therein, said channel fluidly coupling said hole in said first bar and said bore in said top portion;

a shaft, said shaft being rotatably coupled to said top portion of said air wrench, said shaft having a first portion and a second portion, said first portion being positioned adjacent to said air wrench, said second portion having a threaded peripheral wall such that threads extend outwardly from said shaft, wherein said air wrench selectively rotates said shaft in a first direction;

a winch engaging member, said winch engaging member comprising;

a casing, said casing having a top wall, a bottom wall, a front wall, a back wall, a first lateral side wall, and a second lateral side wall, said back wall being securely attached to said second ends of said first and second bars, said hole in said first bar extending into said casing, said second portion of said shaft extending through sa back wall and into said casing, said first lateral side wall having an opening therein;

a coupling member, said coupling member being generally solid and having a first side, a second side, and an outer peripheral wall extending therebetween, said first side of said coupling member having a well extending therein, said well having an inner peripheral wall, said inner peripheral wall having a plurality of holes therein extending towards said outer peripheral wall, said well having a diameter generally equal to a diameter of said cylinder;

a rod, said rod being integrally coupled to and extending away from said second side of said coupling member, said rod extended through said opening in said first lateral side wall of said casing such that said rod is rotatably coupled to said casing, said rod having a portal extending therein, said portal having an opening generally adjacent to a free end of said rod, said portal extending into said coupling member, said portal extending into each of said holes in said coupling member;

a plurality of pistons, each of said pistons being positioned in one of said holes in said coupling member, each of said pistons having a nub thereon for extending into said well, each of said pistons being positionable in one of said holes in said cylinder;

a plurality of biasing means for biasing said pistons away from said well, each of said biasing means being positioned in one of said holes in said coupling member and biasing one of said pistons away from said well, each of said biasing means comprising a spring extending between and securely attached to one of said pistons and a bottom wall of a respective hole;

a gear, said rod extending through and being integrally coupled to said gear, said gear being positioned in said casing, said gear being located such that said threaded portion of said shaft may engage said gear;

an O-ring, said rod extending through said O-ring, said O-ring being positioned between said gear and an inner surface of said first lateral side wall;

a conduit, said conduit being positioned in said lumen, said conduit extending between and fluidly coupling said hole in said first bar and said hole in said protruding member;

a valve member, said valve member being positioned in said conduit;

an actuating means for selectively opening and closing said valve member, said actuating means comprising a lever, said lever being mechanically coupled to said valve member and extending outwardly through said handle portion; and wherein said hose is fluidly coupled to said protruding member such that air may enter said air wrench and said casing when said actuating means is actuated, wherein said nubs are urged into said well such that said nubs may releasably engage said winch, wherein said air wrench may rotate said gear such that said coupling member rotates said winch.

* * * * *